(12) United States Patent
Buck

(10) Patent No.: US 8,072,319 B2
(45) Date of Patent: Dec. 6, 2011

(54) SYSTEM AND METHOD FOR IDENTIFYING A SPARE WHEEL

(75) Inventor: M. Scott Buck, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 864 days.

(21) Appl. No.: 12/115,366

(22) Filed: May 5, 2008

(65) Prior Publication Data

US 2009/0273461 A1   Nov. 5, 2009

(51) Int. Cl.
*B60C 23/00* (2006.01)
(52) U.S. Cl. ........ 340/447; 340/442; 340/445; 340/10.1
(58) Field of Classification Search .......... 340/442–448, 340/10.1, 10.3, 10.4, 10.41; 73/146.2–146.5
See application file for complete search history.

(56) References Cited

U.S. PATENT DOCUMENTS

| | | | | |
|---|---|---|---|---|
| 6,441,728 B1 * | 8/2002 | Dixit et al. | ................... | 340/447 |
| 6,696,935 B2 * | 2/2004 | Bonardi et al. | ............... | 340/447 |
| 6,832,514 B2 * | 12/2004 | Anderson et al. | ............ | 73/146.4 |
| 6,985,076 B1 * | 1/2006 | Bennie et al. | ................ | 340/445 |
| 7,015,801 B1 * | 3/2006 | Juzswik | ........................ | 340/442 |

* cited by examiner

*Primary Examiner* — Daniel Wu
*Assistant Examiner* — Nay Tun
(74) *Attorney, Agent, or Firm* — Ingrassia Fisher & Lorenz P.C.

(57) ABSTRACT

A method is presented for identifying a first wheel on a vehicle, the vehicle including a wireless receiver. The method comprising receiving a plurality of wheel identifiers at the wireless receiver and selecting one of the plurality of wheel identifiers that corresponds to the first wheel based on the number of times that the selected one of the plurality of wheel identifiers is received at the wireless receiver.

14 Claims, 7 Drawing Sheets

SYSTEM AND METHOD FOR IDENTIFYING A SPARE WHEEL

TECHNICAL FIELD

The present invention generally relates to methods for monitoring wheel status and usage on a vehicle, and more particularly relates to a system and method for identifying a spare wheel.

BACKGROUND OF THE INVENTION

A variety of systems exist for detecting the status (e.g., the pressure, the temperature, etc.) of a wheel on a vehicle. As used herein, the word "wheel" whether singular or plural is intended to refer to both the tire and the hub or rim upon which the tire is mounted. In one such system, each of the vehicle's wheels is equipped with at least one wheel sensor for generating data regarding the status of the wheel. An RF transmitter transmits that data to the vehicle. The vehicle includes an RF receiver for receiving, and a processor for analyzing, the data from each of the wheels. Remote wheel monitoring systems such as these provide a mechanism for monitoring a wheel and addressing potential problems, such as low tire pressure, in order to improve the wheel's operation and durability.

During routine operation of the remote wheel monitoring system, each wheel transmits wheel sensor data and a unique wheel identifier. The processor utilizes the wheel identifier to determine the origin of the data. Thus, the processor must know the wheel identifier for each of the vehicle's wheels, including the spare wheel, in order to determine the status of a particular wheel. In addition, if the processor knows the wheel identifier for the spare wheel, it can determine when one of the rolling wheels is replaced with a spare wheel.

Wheel identifiers for each of the rolling wheels may be programmed into the processor during vehicle production. It is also known to place a transmitter in each of the vehicle's wheel wells. Each transmitter sends its position to the wheel that is installed in its wheel well, thus allowing the rolling wheel to determine its wheel position on the vehicle and communicate that information to the processor.

However, while these methods are suitable for identifying the rolling wheels, they are often inadequate for identifying the spare wheel. The spare wheel is often installed, or perhaps changed, during the late stages of production. Thus, it is not practical for the wheel identifier for the spare wheel to be programmed into the processor during the production process. Further, the spare wheel may be stored at a location on the vehicle that does not include a wheel well transmitter. In this case, the spare wheel cannot determine its location and transmit that information to the processor.

Accordingly, it is desirable to have a method for identifying a spare wheel on a vehicle after the vehicle leaves the production plant and dealership environment. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for identifying a first wheel on a vehicle that includes a wireless receiver is presented. The method comprises receiving a plurality of wheel identifiers at the wireless receiver and selecting one of the plurality of wheel identifiers that corresponds to the first wheel based on the number of times that the selected one of the plurality of wheel identifiers is received at the wireless receiver.

A remote wheel monitoring system that is configured to learn a wheel identifier for a spare wheel on a vehicle is presented. The remote wheel monitoring system comprises a wireless transmitter coupled to the spare wheel for transmitting a first unknown wheel identifier, a wireless receiver coupled to the vehicle for receiving a plurality of known and unknown wheel identifiers, and a processor coupled to the wireless receiver. The processor is configured to select the first unknown wheel identifier from the plurality of wheel identifiers based on the number of times that the first unknown wheel identifier is received at the wireless receiver and associate the first unknown wheel identifier with a wheel position for the spare wheel.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description. Although the schematic diagrams shown herein depict example arrangements of elements, additional intervening elements, devices, features, or components may be present in an actual embodiment. It should also be understood that FIGS. 1-7 are merely illustrative and, particularly with respect to FIG. 1, may not be drawn to scale.

As used herein, the words "receiver" and "transmitter" are not intended to be limited merely to describe incoming and outgoing functions, respectively, but are intended to include the meaning of "transceiver" that is, be capable of two-way wireless communication as the need arises.

Figure 1:
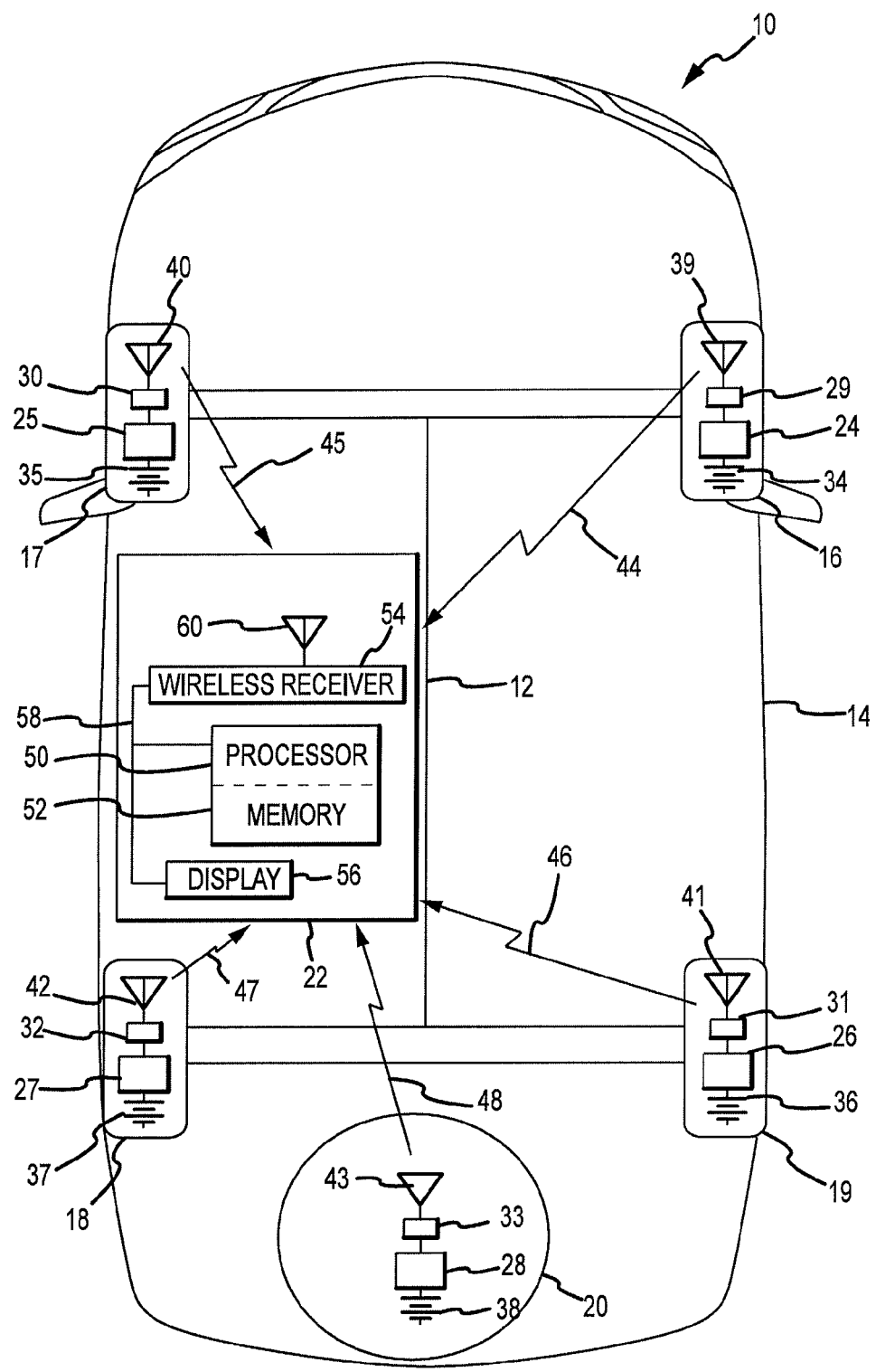
FIG. 1 is a schematic drawing of a vehicle equipped with an exemplary remote tire monitoring system.

FIG. 1 is a schematic drawing of a vehicle 10 equipped with an exemplary remote tire monitoring system. The vehicle 10 includes a chassis 12, a body 14, a plurality of rolling wheels (e.g., four as shown) 16, 17, 18, and 19, a spare wheel 20, and an electronic control system (or electronic control unit (ECU)) 22. The body 14 is arranged on the chassis 12 and substantially encloses the other components of the vehicle 10. The body 14 and the chassis 12 may jointly form a frame.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Each rolling wheel 16-19 is rotatably coupled to the chassis 12 in a predetermined wheel position near a respective corner of the frame 14. In the depicted embodiment, wheel 16 is in the right front position, wheel 17 is in the left front position, wheel 18 is in the right rear position, and wheel 19 is in the left rear position. The spare wheel 20 is used as a replacement for one of the rolling wheels 16-19 in the case of a flat-tire or blow-out and is removably coupled to the chassis 12 in a predetermined position. The spare wheel 20 may be positioned in a storage compartment near the rear of the vehicle 10 (e.g., the trunk). It should be noted however, that in other embodiments the spare wheel 20 may be positioned at other locations on the vehicle 10, such as in the engine compartment or a storage area beneath, or on top of, the vehicle. 10.

Each rolling wheel 16-19 and the spare wheel 20 include a wheel monitor 24, 25, 26, 27, and 28 that is coupled to a wireless transmitter 29, 30, 31, 32, and 33 and a battery 34, 35, 36, 37, and 38. The batteries 34-38 provide electrical power to each respective wheel monitor 24-28 and wireless transmitter 29-33. The wheel monitors 24-28 each comprise at least one sensor for generating data regarding the status of each respective wheel (e.g., the tire pressure, the temperature, and/or whether the wheel is rolling). The wireless transmitters 29-33 each include a wireless antenna 39, 40, 41, 42, and 43 and transmit an RF signal 44, 45, 46, 47, and 48. Each RF signal 44-48 includes data from the corresponding wheel monitor 24-28 and a wheel identifier that is unique to each corresponding wheel.

The wireless transmitters 29-33 transmit the RF signals 44-48 at regular intervals. In some embodiments, the length of these intervals depends on the status of the corresponding wheel. For example, if a wheel monitor 24-28 detects that a wheel is rolling, the wireless transmitter 29-33 transmits RF signals 44-48 at a relatively fast rate, such as once per minute (hereinafter, the "active transmission rate"). Conversely, if the wheel monitor 24-28 detects that the wheel is not rolling, the wireless transmitter 29-33 transmits RF signals 44-48 at slower rate, such as once per hour (hereinafter, the "inactive transmission rate").

Although not shown in detail, the electronic control system 22 includes various sensors and automotive control modules, or electronic control units (ECUs). In the depicted embodiment, the electronic control system 22 also includes a processor 50 and/or a memory 52 having instructions stored therein (or in another computer-readable medium). The processor 50 is coupled to a wireless receiver 54 and a display 56 for providing information to the user of the vehicle via leads or a digital data bus 58. It should be understood that in some embodiments the vehicle 10 may have the functionality of the electronic control system 22 distributed across more than one module and that the processor 50, memory 52, wireless receiver 54, and/or display 56 may be positioned on, or controlled by, other ECUs (e.g., an RF control module).

The wireless receiver 54 is coupled to a wireless antenna 60 and receives RF signals from a plurality of wheels, including rolling wheels 16-19, spare wheel 20, and wheels that are external to the vehicle 10 (e.g., wheels on other vehicles that are temporarily in the vicinity of the vehicle 10). The wireless receiver 54 provides the wheel identifiers and the data from each of these RF signals to the processor 50.

The processor 50 can be a programmable logic control system (PLC), a microprocessor, or any other type of electronic controller known by those skilled in the art. It may be comprised of one or more components of a digital and/or analog type and may be programmable by software and/or firmware, a hardwired state-machine, a combination of these, or any other method known to those skilled in the art.

The processor 50 is configured to associate the wheel identifiers for rolling wheels 16-19 and spare wheel 20 with their respective wheel positions on the vehicle 10 and to store this information in memory 52. For example, for the vehicle 10 depicted in FIG. 1 the processor 50 would associate the wheel identifier for wheel 16 with the right front wheel position, the wheel identifier for wheel 17 with the left front wheel position, the wheel identifier for wheel 18 with the right rear wheel position, the wheel identifier for wheel 19 with the left rear wheel position, and the wheel identifier for the spare wheel 20 with the position where the spare wheel is stored.

As used herein, "learning" a wheel identifier refers to associating the wheel identifier with the appropriate wheel position in memory 52. In addition, a wheel identifier is "known" if it is associated with a wheel position in memory 52 and "unknown" if it is not associated with a wheel position. As described above, the method for learning the wheel identifiers for rolling wheels 16-19 may comprise programming them into the processor 50 during vehicle production or using individual wheel well transmitters that send location information to the wheel 16-19 that is forwarded to the processor 50 via the wireless transmitter 29-33. The method for learning the wheel identifier for spare wheel 20 is the subject of the present invention.

For the purposes of the following description, it will be assumed that the wheel identifiers for rolling wheels 16-19 are known and that the wheel identifier for the spare wheel 20 is not known. As mentioned above, during normal operation of the remote wheel monitoring system, the wireless receiver 54 receives RF signals 44-47 from rolling wheels 16-19. These RF signals 44-47 include known wheel identifiers that the processor 50 uses to determine the origin of the RF signal 44-47. The processor 50 then uses the associated data to determine the status of the appropriate wheel 16-19 and alerts the driver of the vehicle 10, via the display 56, of any potential issues.

In addition, the wireless receiver 54 also receives RF signals 48 from the spare wheel 20 and from wheels that are external to the vehicle 10 during operation of the remote tire monitoring system. The wheel identifiers for these RF signals are unknown, and, therefore, the processor cannot determine their origin. Over time, however, the wheel identifier for the unknown spare wheel 20 is received more often than the wheel identifiers that correspond to wheels that are external to the vehicle. Therefore, processor learns the wheel identifier for an unknown spare wheel 20 by maintaining a record of all the unknown wheel identifiers that are received at the wireless receiver 54, and identifying which is received most often.

As further described below with regard to FIG. 2, each time an RF signal is received at the wireless receiver 54, processor 50 determines if the wheel identifier for the RF signal is a known wheel identifier (e.g., a wheel identifier that corresponds to one of the rolling wheels 16-19) or an unknown wheel identifier (e.g., a wheel identifier that corresponds to the unknown spare wheel 20 or a wheel that is external to the vehicle). In the case of a known wheel identifier, the processor 50 uses the data from the RF signal 44-47 to determine the status of the wheel. In the case of an unknown wheel identifier, the processor 50 stores information regarding the unknown wheel identifier, including the number of times that each unknown wheel identifier is received, in memory 52. The processor then uses a predetermined priority scheme to select the unknown wheel identifier that is received most often at the wireless receiver 54 and associates the selected wheel identifier with the location for the spare wheel 20 in memory 52.

Figure 2:
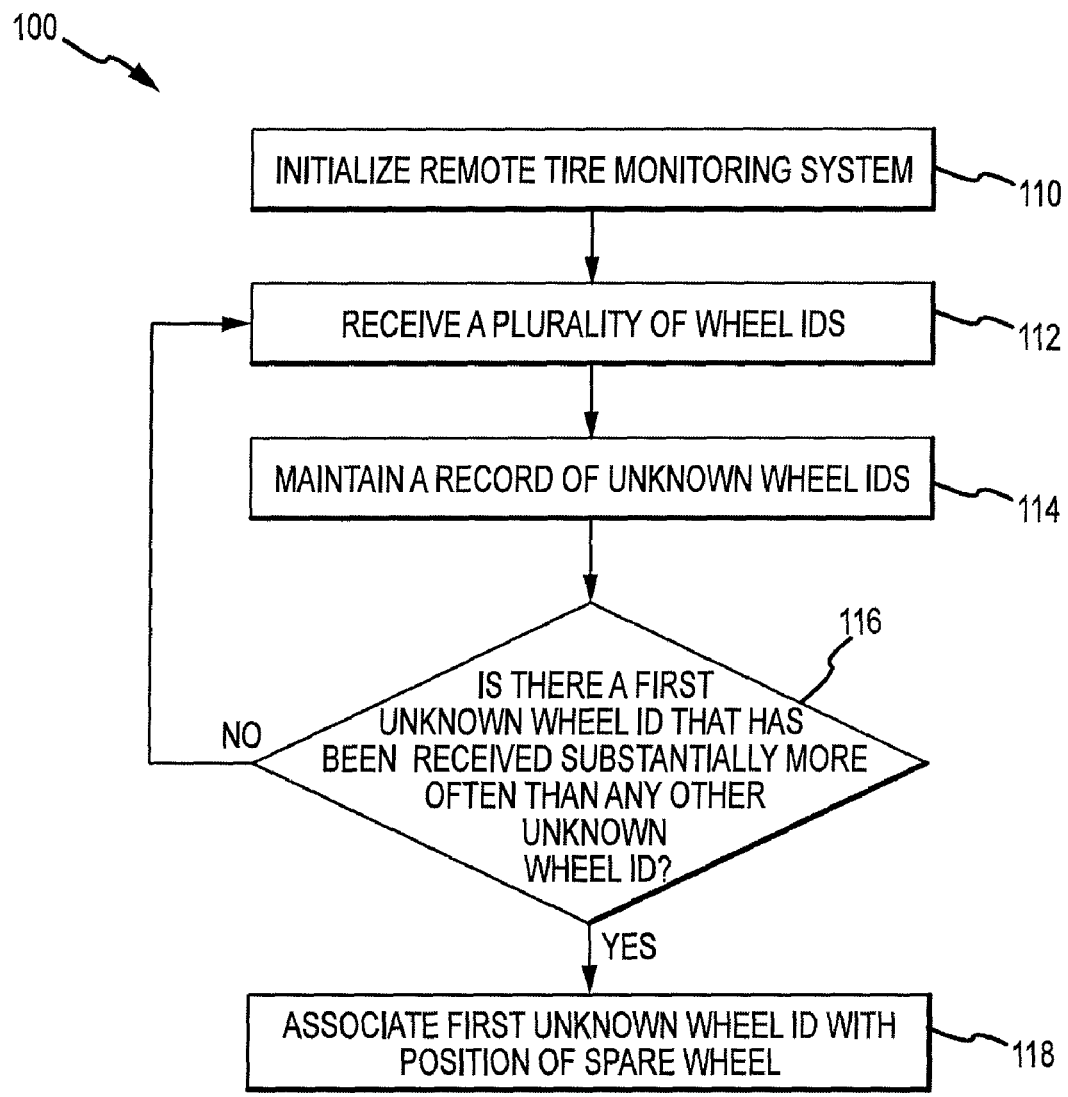
FIG. 2 is a flowchart of an exemplary method for determining the wheel identifier for the spare wheel of a vehicle.

FIG. 2 is a flowchart of an exemplary method 100 for determining the wheel identifier for a spare wheel on a vehicle (e.g., the vehicle 10 of FIG. 1). It should be understood that the steps of method 100 are performed by a vehicle having a processor (e.g., the processor 50 of FIG. 1) that is coupled to a wireless receiver (e.g., the wireless receiver 54 of FIG. 1).

As depicted, method 100 begins with the initialization of the remote wheel monitoring system (step 110). Next, a plurality of wheel identifiers is received at the wireless receiver (step 112). The plurality of wheel identifiers comprises at least one unknown wheel identifier that corresponds to the spare wheel (e.g., the spare wheel 20 of FIG. 1) or to a wheel that is external to the vehicle. The processor maintains a record of each of the unknown wheel identifiers and stores this information in memory during step 114.

During step 116, the processor uses a predetermined priority scheme to select a first unknown wheel identifier that is received at the wireless receiver most often over time. If the processor is unable to identify a first unknown wheel identifier during step 116, method 100 returns to step 112. On the other hand, if the processor is able to select a first unknown wheel identifier, method 100 proceeds to step 118 and the processor associates the first unknown wheel identifier with the position of the spare wheel.

Figure 3:
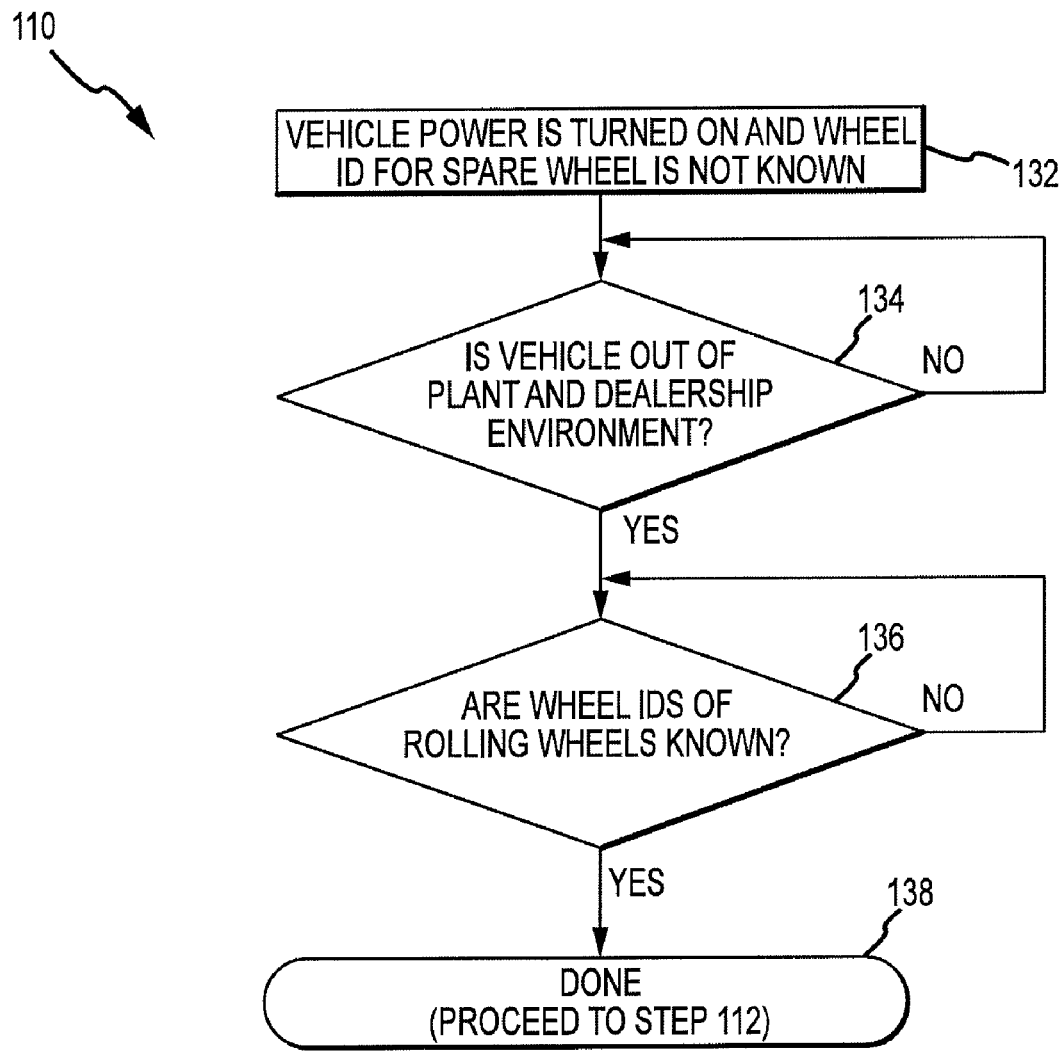
FIG. 3 is a flowchart of an exemplary method for initializing a remote tire monitoring system.

FIG. 3 is a flowchart of an exemplary method 110 (FIG. 2) for initializing a remote tire monitoring system. As depicted, during method 110 the vehicle is turned on and the wheel identifier for the spare wheel is not known (step 132). In one embodiment the processor maintains a flag (SPARE) that can be set when the wheel identifier for the spare wheel is known and reset when the wheel identifier for the spare wheel is not known. For example, SPARE may be reset if the processor is learning the wheel identifier for the spare wheel for the first time or if the user of the vehicle provides an input directing the processor to relearn the wheel identifier for the spare wheel. If SPARE is set, the wheel identifier for the spare wheel is known and there is no need for the processor to perform method 100 (FIG. 2).

Next, during step 134 the processor detects when the vehicle has traveled a predetermined distance (D). Preferably, D is a value large enough to ensure that the vehicle is no longer at the production plant or the vehicle dealership. This ensures that the vehicle has a spare wheel installed and is operating under normal conditions without interference from other wheels or other vehicles at the production plant or the dealership.

The processor then determines if the wheel identifiers for the rolling wheels (e.g., wheels 16-19 of FIG. 1) are known (step 136). If the wheel identifiers for the rolling wheels are not known, method 110 is suspended while the processor learns those wheel identifiers. Otherwise, if the wheel identifiers of the rolling wheels are known, method 110 is complete (step 138) and the processor proceeds to step 112 of method 100 (FIG. 2).

Figure 4:
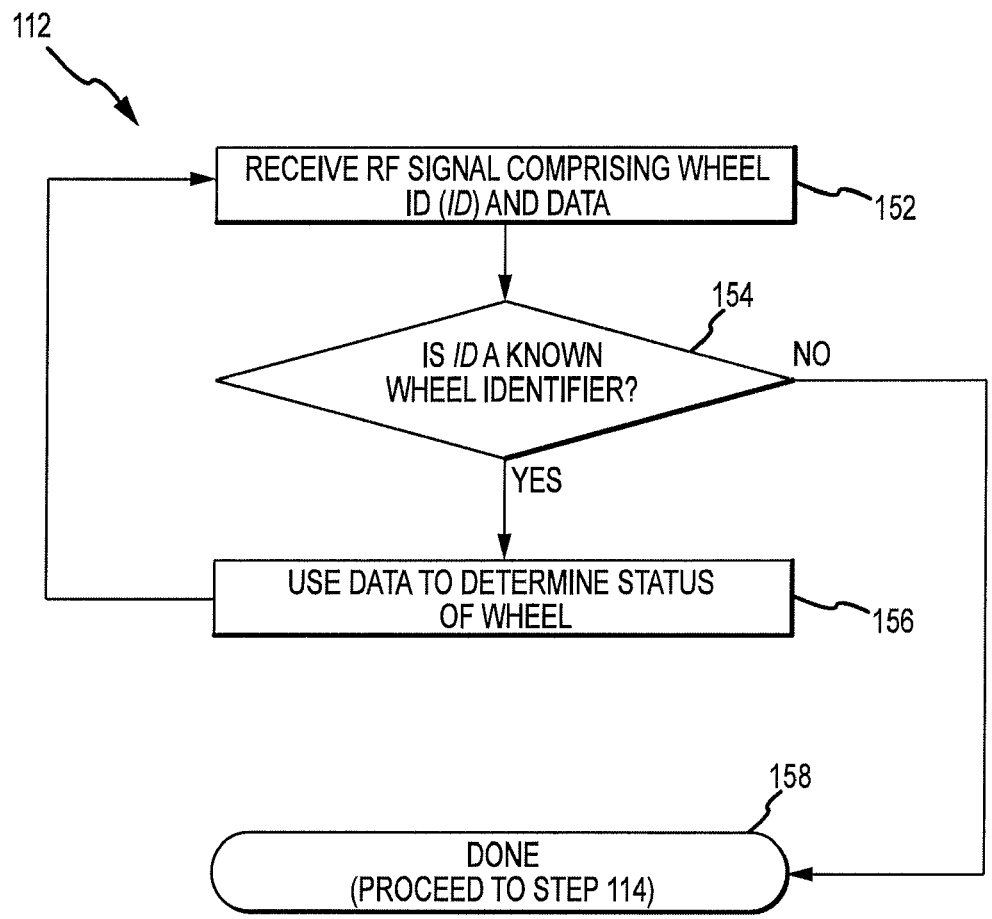
FIG. 4 is a flowchart of an exemplary method for receiving a plurality of wheel identifiers.

FIG. 4 is a flowchart of an exemplary method 112 (FIG. 2) for receiving the plurality of wheel identifiers. As depicted, method 112 begins when an RF signal comprising a wheel identifier (ID) and data regarding the status of a wheel is received at the wireless receiver (step 152). The processor determines if ID is a known wheel identifier (e.g., if it corresponds to one of the rolling wheels) during step 154. If ID is a known wheel identifier, the processor uses the data to determine the status of the wheel and performs additional tasks, such as notifying the driver when the tire pressure is low (step 156). Method 112 then returns to step 152. On the other hand, if ID is not a known identifier, method 112 is complete (step 158) and the process proceeds to step 114 of method 100 (FIG. 2).

Returning to FIG. 2, during step 114 the processor maintains a record of the unknown wheel identifiers that are received at the wireless receiver during step 112. This record includes the unknown wheel identifier itself and a counter that indicates the number of times that the unknown wheel identifier is received at the wireless receiver.

Figure 5:
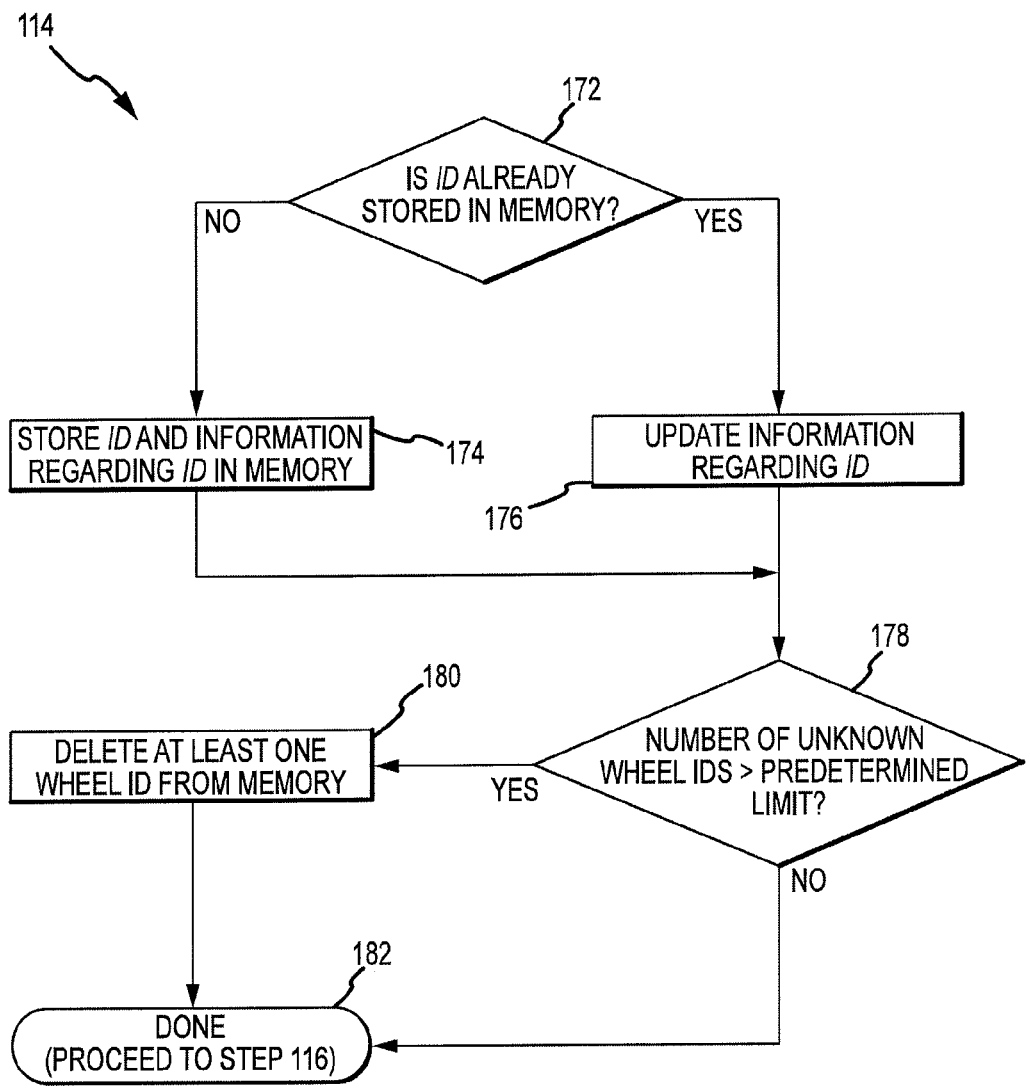
FIG. 5. is a flowchart of an exemplary method for maintaining a record of unknown wheel identifiers that are received at a wireless receiver.

FIG. 5. is a flowchart of an exemplary method 114 (FIG. 2) for maintaining a record of unknown wheel identifiers that are received at the wireless receiver. As depicted, method 114 begins when the processor determines if ID, the unknown wheel identifier that was received during step 112 of FIG. 2, is already stored in memory (step 172). If ID is not already stored in memory, the processor stores ID and additional information regarding ID, such as the counter for ID (step 174). On the other hand, if ID is already stored in memory (e.g., because ID was received during a previous iteration of step 112 of FIG. 2) the processor updates the existing information regarding ID, such as the counter (step 176).

In some embodiments, the processor limits the number of unknown wheel identifiers that can be stored in memory at one time. Accordingly, in step 178 the processor determines if the number of unique wheel identifiers that are stored in memory exceeds a predetermined limit (e.g., fifteen). If so, the processor deletes at least one of the unknown wheel identifiers, and its associated information, from memory according to a predetermined priority scheme (step 180). For example, the processor may delete the unknown wheel that has not been received at the wireless receiver for the longest period of time. Method 114 is then complete (step 182) and method 100 (FIG. 2) proceeds to step 116.

As described above, over time the unknown wheel identifier that corresponds to the spare wheel is received at the wireless receiver substantially more often than any other unknown wheel identifier. Therefore, during step 116 the processor analyzes the unknown identifiers that are stored in memory and determines if one has been received substantially more often than the others. The processor selects this wheel identifier as the wheel identifier for the spare wheel.

Figure 6:
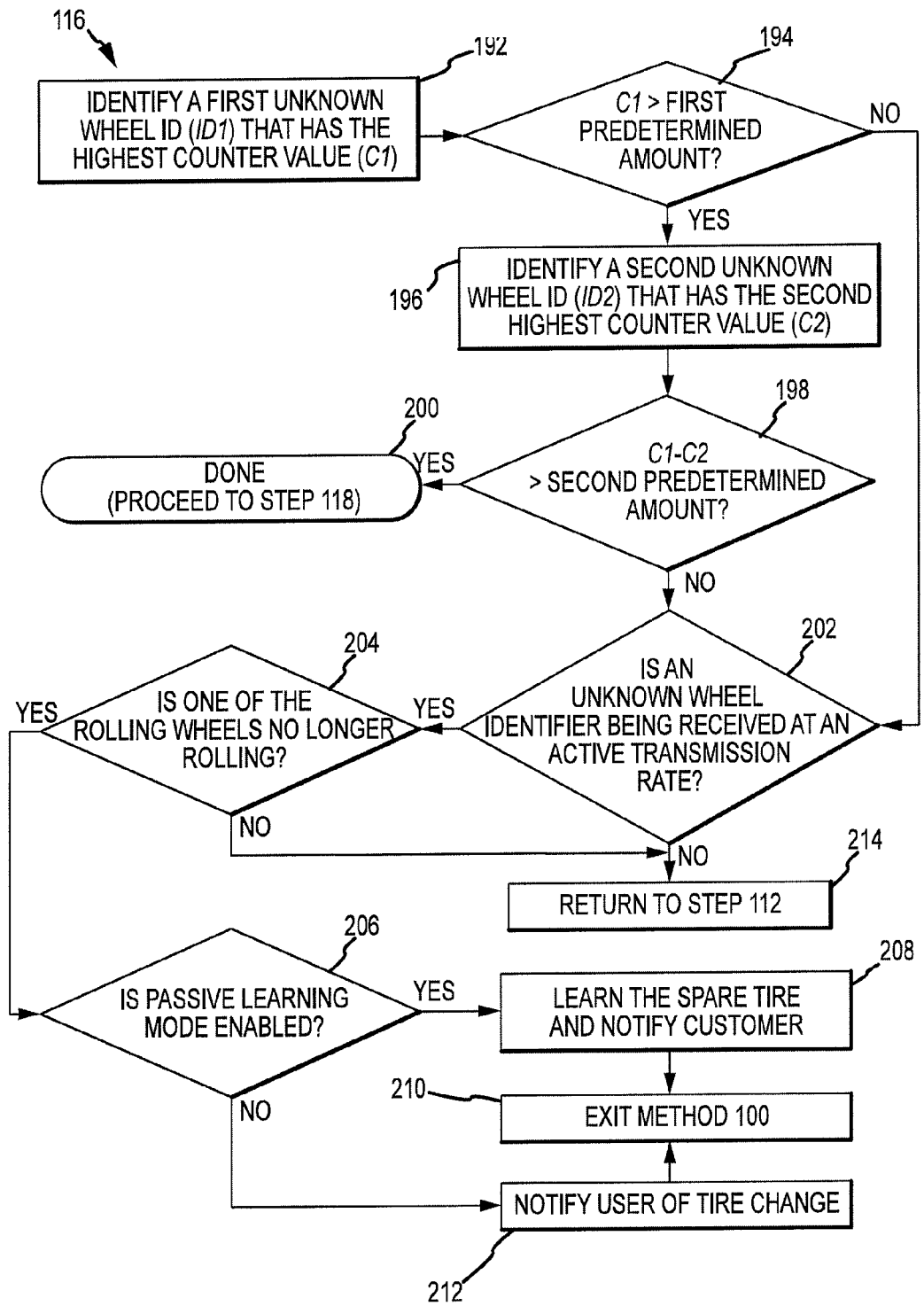
FIG. 6 is a flowchart of an exemplary method for selecting a wheel identifier for the spare wheel from a plurality of unknown wheel identifiers.

FIG. 6 is a flowchart of an exemplary method 116 (FIG. 2) for selecting a wheel identifier for the spare wheel from a plurality of unknown wheel identifiers. As depicted, during step 192 the processor identifies the unknown wheel identifier (ID1) having the highest counter (C1) from the plurality of unknown wheel identifiers that are stored in memory. Next, during step 194 the processor determines if C1 is greater than a first predetermined amount (PA1) during step 194. PA1 should be set at a value (e.g., 200) that ensures the processor does not attempt to select a wheel identifier for the spare wheel until the vehicle is operating under normal conditions and the spare wheel is transmitting RF signals to the wireless receiver at a constant rate (e.g., once per hour). If C1 exceeds PA1, method 116 proceeds to step 196.

During step 196, the processor identifies the unknown wheel identifier (ID2) having the second highest counter (C2) from the plurality of unknown wheel identifiers that are stored in memory. The processor then determines if the difference between C1 and C2 exceeds a second predetermined amount (PA2) during step 198. PA2 should be set at a value (e.g., 50) such that if the difference between C1 and C2 exceeds PA2, then ID1 has been received at the wireless receiver substantially more often than ID2, and the remaining unknown wheel identifiers that have counters that are less than C2. If the difference between C1 and C2 is greater than PA2, method 116 is complete (200) and method 100 proceeds to step 118 FIG. 2.

On the other hand, if C1 is less than PA1 or the difference between C1 and C2 is less than PA2, then the wireless receiver must receive more unknown wheel identifiers (e.g., step 112 of FIG. 2) before the processor can determine which one belongs to the spare wheel. However, before returning to step 112 of FIG. 2, method 116 determines whether one of the rolling wheels of the vehicle has been replaced with the spare wheel before the processor was able to determine the wheel identifier for the spare wheel.

To detect when this is the case, the processor determines whether one of the stored unknown wheel identifiers (ID3) has gone from an inactive transmission rate (e.g., transmitting an RF signal once per hour) to an active transmission rate (e.g., transmitting an RF signal once per minute) during step 202. If so, the processor determines if one of the rolling wheels on the vehicle is no longer rolling at a time when the other rolling wheels are rolling (step 204). For example, the processor may determine if one of the rolling wheels has gone from transmitting RF signals at the active transmission rate to transmitting RF signals at the inactive transmission rate at the same time that the other rolling wheels are still transmitting RF signals at the active transmission rate or if one of the rolling wheels has transmitted an RF signal comprising data that indicates that a flat-tire has occurred.

If the processor identifies an unknown wheel identifier that is transmitting RF signals at an active transmission rate during step 202 and determines that one of the rolling wheels is no longer rolling during step 204, then the processor determines whether the remote tire monitoring system is operating in a passive learning mode (step 206). Passive learning mode allows the processor to learn a wheel identifier without receiving any input from the user of the vehicle. If passive learning mode is enabled, the processor may learn or relearn a wheel identifier for a wheel position on the vehicle whenever it detects that the wheel in that position has changed. However, if passive learning mode is not enabled, the processor cannot learn or relearn the wheel identifier for a wheel position on the vehicle unless the user of the vehicle provides a confirmation that the wheel has changed.

If the processor determines that passive learning mode is enabled during step 206, method 116 proceeds to step 208. During step 208 the processor associates ID3 with the appropriate wheel position and stores that that information in memory. In addition, the processor may provide a message to the user of the vehicle, via a display (e.g., the display 56 of FIG. 1), indicating that a wheel change has been detected. Finally, the processor enables any systems or methods that require the processor to know the wheel identifier for the spare wheel and sets SPARE. The processor then exits method 100 of FIG. 2 (step 210).

On the other hand, if the processor determines that passive learning mode is not enabled during step 206, then the processor provides a message to the user of the vehicle, via the display, indicating that it has detected a wheel change (step 212). In addition, the processor may request that the user perform a specific action, such as inflating the appropriate tire. The processor does not associate ID3 with the appropriate wheel position unless the user performs the requested user action. The processor then exits method 100 of FIG. 2 (step 210).

Finally, returning to steps 202 and 204, if the processor is unable to identify an unknown wheel identifier that is transmitting at an active rate or a rolling wheel on the vehicle that is no longer rolling, method 116 returns to step 112 of method 100 of FIG. 2 (step 214).

Figure 7:
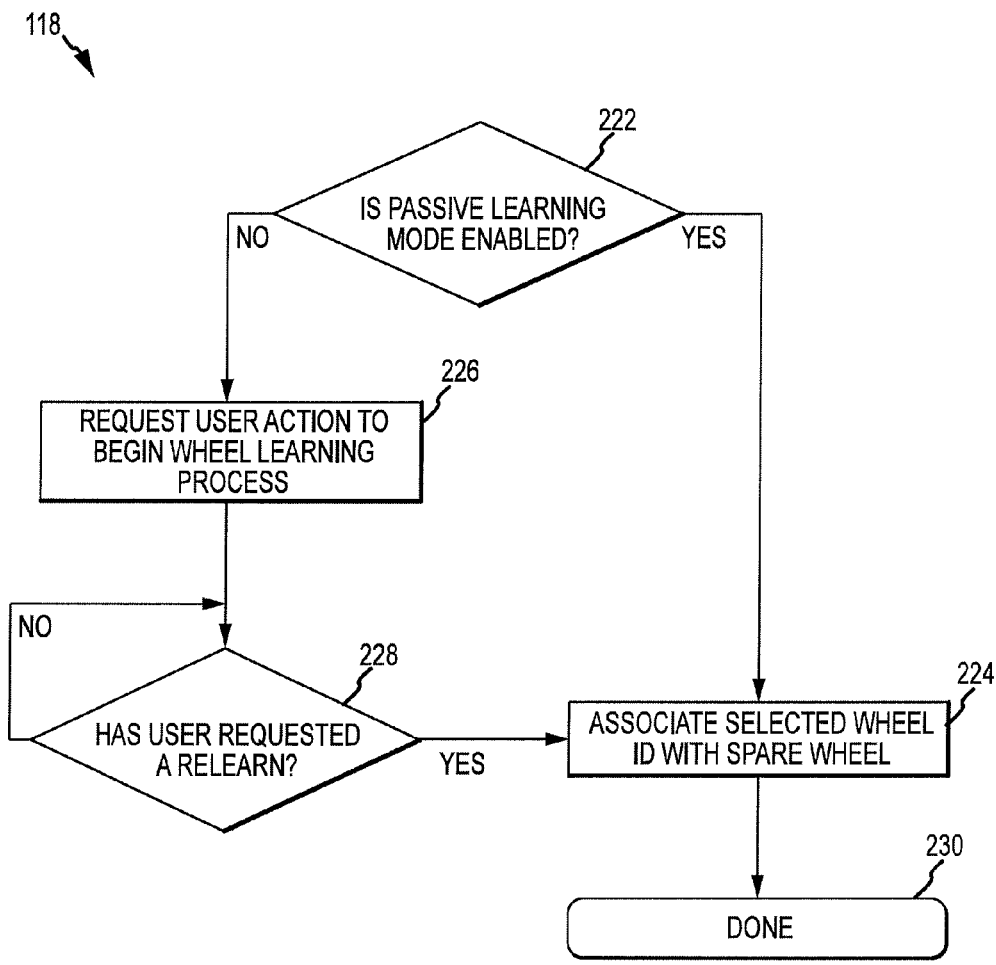
FIG. 7 is a flowchart of an exemplary method for associating the wheel identifier for the spare wheel with the wheel position of the spare wheel.

Returning again to FIG. 2, during step 118 the processor associates the first unknown wheel identifier that was selected during step 116 with the wheel position for the spare wheel. FIG. 7 is a flowchart of an exemplary method 118 (FIG. 2) for associating an unknown identifier with the wheel position of the spare wheel. As depicted, method 118 begins at step 222. i.e. the processor determines if the remote tire monitoring system is operating in passive learning mode. If passive learning mode is enabled, the processor associates ID1 with the location of the spare wheel in memory (step 224).

On the other hand, if passive learning mode is not enabled, the processor provides a message to the user of the vehicle, via the display, requesting that the user of the vehicle perform a specific action (e.g., such as inflating the spare wheel) to confirm that the processor should learn or relearn the wheel identifier for the spare wheel (step 226). Method 118 is then suspended until the user of the vehicle performs the requested user action (e.g., until the user inflates the spare wheel) during step 228. After the user performs the requested user action, method 118 proceeds to step 224 and the processor associates ID1 with the wheel position for the spare wheel.

Finally, the processor enables any systems or methods that require the wheel identifier for the spare wheel to be known before they can function. For example, the processor may enable a method for automatically detecting when the spare wheel replaces one of the rolling wheels. In addition, the processor sets SPARE. Method 118 is then complete (step 230).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for identifying a first wheel on a vehicle, the vehicle including a wireless receiver, the method comprising:

receiving a plurality of wheel identifiers at the wireless receiver, wherein the plurality of wheel identifiers include known wheel identifiers and unknown wheel identifiers;

storing each unknown wheel identifier and a count of the number of times that it is received at the wireless receiver;

selecting one of the plurality of wheel identifiers that corresponds to the first wheel based on the number of times that the selected one of the plurality of wheel identifiers is received at the wireless receiver by identifying a first unknown wheel identifier having a largest count, identifying a second unknown wheel identifier having a second largest count, and selecting the first unknown wheel identifier if the difference between the count of the first unknown wheel identifier and the count of the second unknown wheel identifier is greater than a first predetermined number.

2. The method of claim 1, further comprising:
deleting at least one stored unknown wheel identifier and its corresponding count if the total number of stored unknown wheel identifiers exceeds a predetermined limit.

3. The method of claim 2, wherein the at least one stored unknown wheel identifier is deleted based on the time at which each of the stored unknown wheel identifiers was most recently received at the wireless receiver.

4. The method of claim 1, wherein the step of selecting one of the plurality of wheel identifiers further comprises selecting the first unknown wheel identifier if:
the difference between the count of the first unknown wheel identifier and the count of the second unknown wheel identifier exceeds the first predetermined number; and
the count of the first unknown wheel identifier exceeds a second predetermined number.

5. The method of claim 1, further comprising:
detecting when a third unknown wheel identifier is received at the wireless receiver at an active transmission rate if the first unknown wheel identifier has not been selected;
detecting when a first rolling wheel on the vehicle is not rolling at a time when the other rolling wheels on the vehicle are rolling; and
associating the third unknown wheel identifier with the wheel position of the first rolling wheel if a passive learning mode is enabled.

6. The method of claim 1, further comprising associating the selected one of the plurality of wheel identifiers with the wheel position for the first wheel.

7. The method of claim 6, wherein the step of associating further comprises:
associating the selected one of the plurality of wheel identifiers with the wheel position of the first wheel if a passive learning mode is enabled.

8. The method of claim 7, further comprising:
associating the selected one of the plurality of wheel identifiers with the wheel position of the first wheel after a user of the vehicle performs a requested user action if the passive learning mode is not enabled.

9. The method of claim 8, wherein the requested user action comprises inflating the first wheel.

10. A method for learning a wheel identifier for a spare wheel on a vehicle, the vehicle including a wireless receiver, the method comprising:
receiving a plurality of wheel identifiers at the wireless receiver, including both known wheel identifiers and unknown wheel identifiers;
storing each unknown wheel identifier and a count of the number of times that it is received at the wireless receiver;
selecting a first unknown wheel identifier that corresponds to the spare wheel based on the number of times that the first unknown wheel identifier is received at the wireless receiver by identifying the first unknown wheel identifier having a largest count, identifying a second unknown wheel identifier having a second largest count, and selecting the first unknown wheel identifier if the count of the first unknown wheel identifier exceeds a first predetermined number, and if the difference between the count of the first unknown wheel identifier and the count of the second unknown wheel identifier exceeds a second predetermined number; and
associating the first unknown wheel identifier with the wheel position for the spare wheel.

11. The method of claim 10, wherein the step of associating further comprises associating the first unknown wheel identifier with the wheel position of the spare wheel if a passive learning mode is enabled.

12. The method of claim 11, wherein the step of associating further comprises:
associating the first unknown wheel identifier with the wheel position of the spare wheel after a user of the vehicle performs a requested user action if the passive learning mode is not enabled.

13. A remote wheel monitoring system configured to learn a wheel identifier for a spare wheel on a vehicle, the remote wheel monitoring system comprising:
a wireless transmitter coupled to the spare wheel for transmitting a first unknown wheel identifier;
a wireless receiver coupled to the vehicle for receiving a plurality of wheel identifiers, including both known wheel identifiers and unknown wheel identifiers; and
a processor, coupled to the wireless receiver and configured to:
store each unknown wheel identifier and a count of the number of times that it is received at the wireless receiver;
identify the first unknown wheel identifier having a largest count;
identify a second unknown wheel identifier having a second largest count;
select the first unknown wheel identifier from the plurality of wheel identifiers based on the number of times that the first unknown wheel identifier is received at the wireless receiver, wherein the processor is configured to select the first unknown wheel identifier if the count of the first unknown wheel identifier exceeds a first predetermined number, and if the difference between the count of the first unknown wheel identifier and the count of the second unknown wheel identifier exceeds a second predetermined number; and
associate the first unknown wheel identifier with the wheel position for the spare wheel.

14. The remote wheel monitoring system of claim 13, wherein the processor is further configured to:
associate the first unknown wheel identifier with the wheel position of the spare wheel if a passive learning mode is enabled; and
associate the first unknown wheel identifier with the wheel position of the spare wheel after a user of the vehicle performs a requested user action if the passive learning mode is not enabled.

* * * * *